United States Patent [19]
Sheu

[11] Patent Number: 6,039,406
[45] Date of Patent: Mar. 21, 2000

[54] HUBCAP FASTENER STRUCTURE

[75] Inventor: Lih-Ching Sheu, Tainan Hsien, Taiwan

[73] Assignee: Kuan Hsieng Industrial Co., Ltd., Taipei Hsien, Taiwan

[21] Appl. No.: 09/076,797

[22] Filed: May 13, 1998

[51] Int. Cl.[7] .................................................. B60B 7/06
[52] U.S. Cl. ..................................... 301/108.4; 301/37.37
[58] Field of Search .............................. 301/37.1, 37.37, 301/37.42, 108.1, 108.4

[56] References Cited

U.S. PATENT DOCUMENTS 5,297,854   3/1994   Nielsen et al. ........................ 301/37.37

*Primary Examiner*—Russell D. Stormer
*Attorney, Agent, or Firm*—Bacon & Thomas

[57] ABSTRACT

The disclosed invention relates to a kind of hubcap fastener structure that mainly consists of a number of fittings. Each fitting has an attachment surface and there is a mounting hole in the attachment surface, with numerous retainer claws along the inner circumference of the mounting hole and a number of retainer strips that extend from the opposite end of the attachment surface. There is an engagement hook on each retainer strip that enables each retainer strip of the fittings to be inserted into the insertion slot of each of the outer tubular mount and an inner tubular mount of the fastening mount on the hubcap. Furthermore, the mounting holes and retainer claws of the attachment surface are positioned in alignment with the bolt nuts projecting from the vehicle rim and the installation is completed through the secure insertion of the invention into the insertion slots of the fastening mount.

5 Claims, 2 Drawing Sheets

HUBCAP FASTENER STRUCTURE

BACKGROUND OF THE INVENTION

1. Field of the Invention

The invention herein relates to a kind of hubcap fastener structure that is simple in design and that can be installed securely to the outer axle hubs of vehicles.

2. Description of the Related Art

Installable hubcaps are common automobile tire accessories that provide for the decorative covering of unattractive tire rim exteriors. Conventional hubcaps include rim caps, axle hub caps and spoke caps. Of these, rim caps cover the entire exterior side of the tire rim, axle hubcaps are fitted over the projecting axle ends, and spoke caps are installed over the circumferential edge of the tire rim The invention herein is an improved fastener structure for axle hubcaps, of which a conventional hubcap fastener structure is shown in FIG. 3. When a typical aluminum alloy rim (1) is installed onto the bolts (12) at the end of a vehicle axle (11), each bolt (12) is surrounded by a recessed circular area (13) for the nuts (14) to fasten the rim (1) via an axle hole (16) through which the an axle end (15) protrudes through the rim (1). The conventional hubcap (2) is often comprised of a cap (21) and fittings (211) molded as a single entity, with numerous openings (221) aligned with the are fittings (211). Furthermore, the are openings (221) are connect with the fittings (211) of sleeve mounts (22) of the cap (21), and there are a number of semicircular collars (222) positioned at equal intervals in a circular pattern. The semicircular collars (222) are positioned with the sleeve mounts (22), the forked holes (223) of the lower mounts (224) at matching intervals, with as well as a number of inner fasteners (225) and the outer bottoms (226) of fittings (227), which are also positioned in a circular pattern at equal intervals. At the same time, there are mounting springs (23) between an upper extent of the lower mounts (224) and forked holes (223) and the lower extent of the fitting mounts (227) and the inner fasteners (225). The hubcap (2) is held against the fitting mounts (227) through the elastic tension of the mounting springs (23). The fitting mounts are inserted into the recessed circular area (13) of the rim (1), with the outer bottoms (226) of the fitting mounts (227) being inserted into the recessed circular area (13) to achieve mounting.

Although the prior art mounting method of the hubcap (2) is ideal, the structure of the hubcap is quite complex, especially with regards to the forming of the collars (222), the lower mounts (224) and the fittings (227) on the sleeve mounts (22). A general wheel pattern has five holes and when multiplied by a factor of three per hole, the total number of structural elements for each hole is increased to 15 components. To manufacture all of these compoments requires complex molding processes and raises production costs. Furthermore, the installation of the fittings (211) onto the cap (21), as well as the installation of the mounting springs (23) between the lower mounts (224) and the fitting mounts (227), is very difficult. This installation process results in an excessive assembly period that is economically unfeasible, with fitting mounts (227) positioning of the into the recessed circular area (13) of the rim (1) presenting problems that affect the safety of the entire assembly.

SUMMARY OF THE INVENTION

The primary objective of the invention herein is to provide an improved hub. cap fastener structure that mainly is comprised of a number of fittings. Each fitting has an attachment surface and there is a mounting hole in the attachment surface. The attachment surface has numerous retainer claws along the inner circumference of the mounting hole and a number of retainer strips extending from the other end of the attachment surface. There is an engagement hook on each retainer strip that enables each retainer strip to be inserted into an interval between outer tubular mounts and the inner tubular mounts of fastening mounts on hubcap. Furthermore, the mounting holes and retainer claws of the attachment surface are positioned in alignment with bolt nuts projecting from the vehicle rim, and the installation is durably completed through the tight insertion of the invention herein.

BRIEF DESCRIPTION OF THE DRAWINGS

Other features and advantages of the invention herein will become apparent in the following detailed description of the preferred embodiments, with reference to the accompanying drawings below.

DETAILED DESCRIPTION OF THE PREFERRED EMBODIMENTS

In the detailed description of the preferred embodiments of the invention, similar elements are indicated by the same numeral throughout the disclosure.

Figure 1:
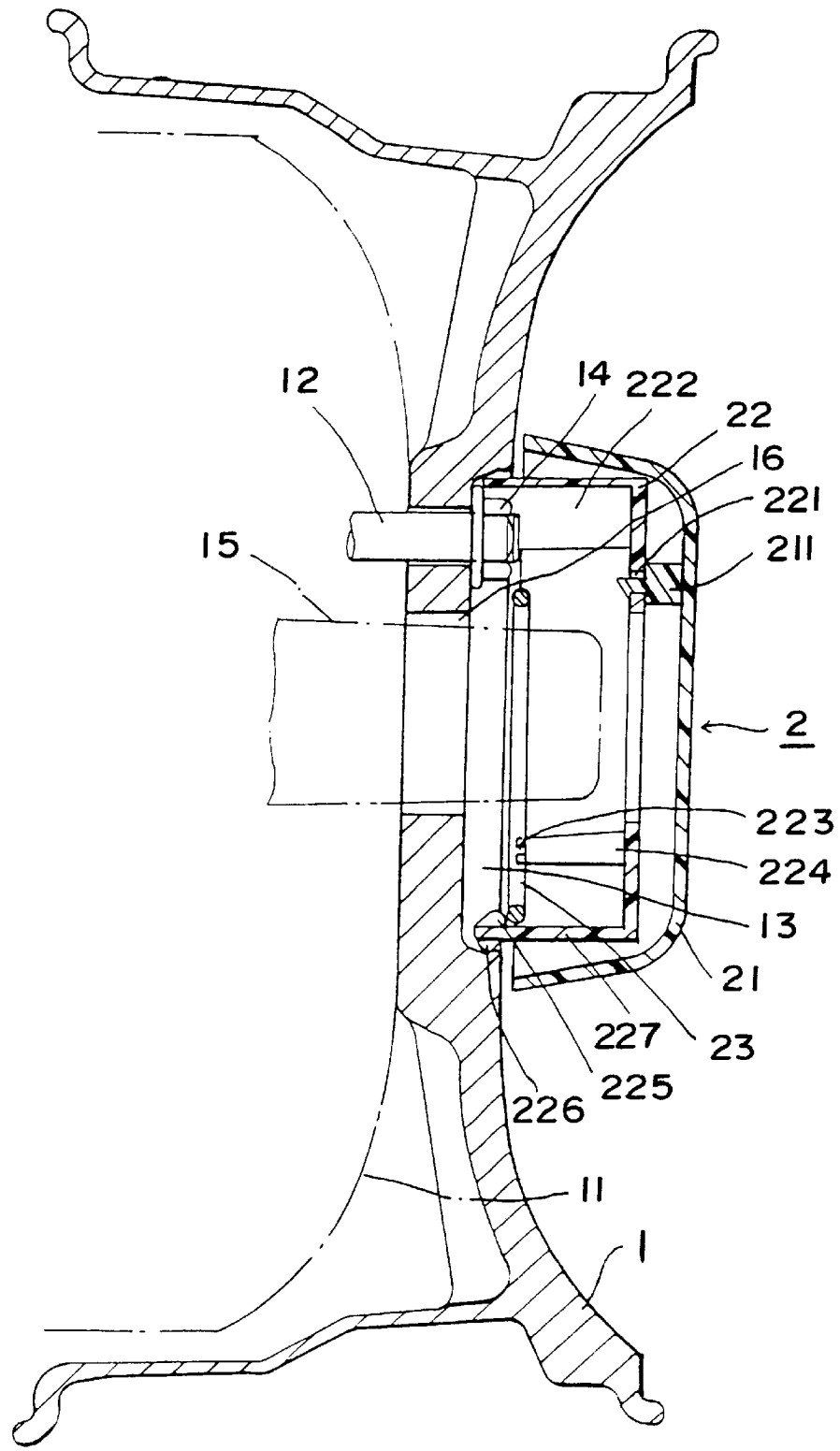
FIG. 1 is a cross-sectional drawing of a conventional hubcap fastener structure.
Figure 2:
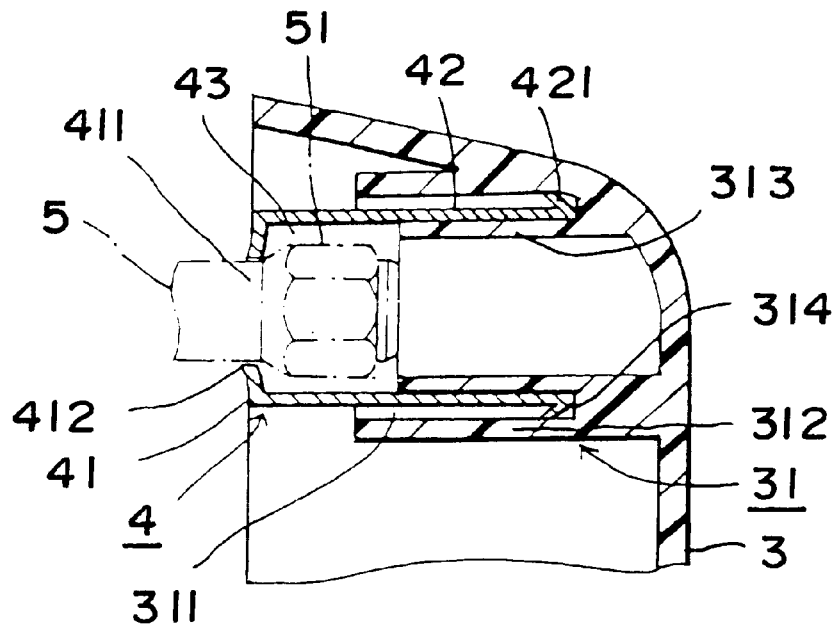
FIG. 2 is a partial cross-sectional drawing of the preferred embodiments of the invention herein.

Referring to FIG. 2, the fastener structure of the preferred embodiments of the invention herein is comprised of a number of fastening mounts (31) positioned apart in a circular arrangement at spaced intervals on a cap (3). Situted and concentrically positioned at an appropriate interval from each fastening mount (31) is an outer tubular mount (312) and an inner tubular mount (313). The length of the inner tubular mount (313) is less than the length of the outer tubular mount (312), where inner tubular mount (313) and the outer tubular mount (312) each have an insertion slot (311) that is abutted by a bottom edge (314).

Figure 3:
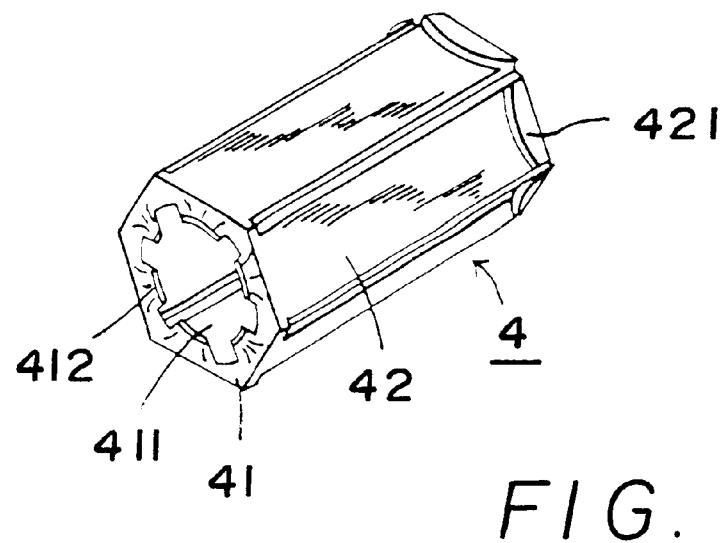
FIG. 3 is an isometric drawing of the fitting of the preferred embodiments of the invention herein.

Furthermore, there are a number of fittings (4), with each fitting (4), as indicated in FIG. 3, having an attachment surface (41). There is a mounting hole (411) in center of the attachment surface (41), with a number of retainer claws (412) protruding at equal intervals spaced apart along the inner circumference of the mounting hole (411). Each of the retainer claws (412) is angled towards the outer extent of the attachment surface (41), and extending equidistantly from the other end of the attachment surface (41) are a number of retainer strips (42). Further more, there are engagement hooks (421) that curve outward from the end of each retainer strip (42).

Referring to FIG. 3, each fitting (4) is installed by inserting the retainer strips (42) of the fitting (4) into the insertion slots (311) of the outer tubular mount (312) and the inner tubular mount (313). The engagement hooks (421) of the retainee strips (42) contact the bottom edge (314) of the insertion slots (311), such that each fitting (4) is attached onto the fastening mount (31) by means of the engagement hooks (421) at the ends of the retainer strips (42). During the overall installation to the tire rim, the mounting holes (411) of the fittings (4) are placed over the bolts (5) projecting from the vehicle axle hub. Pressure is then applied to the entire fastening mount (31) to enable the retainer claws (412) of the mounting hole (411) to travel against the nut (51) of each bolt (5) and into the area (43) between the retainer claws (412) and the inner tubular mount (313) of the fastening mount (31). After the retainer claws (412) have traveled past the nuts (51) the cap (3) is securely fastened to the area of installation and is not prone to work loose easily, because the tensility of the retainer claws (412) allows the retainer claws (412) to return to original shape and prevent dislodgement from the nuts (51).

The structural design of the preferred embodiments of the invention has the following advantages:

1. The general structure is very simple and manufacturing only requires two molds for the fabrication of the cover and the fittings. Furthermore, molding cost is very low because the fittings are physically compact.

2. The structural simplicity enables very easy processing and assembly that reduces production time and cost.

3. For vehicle hubs having five bolts, five fittings can be installed to the fastening mounts on the cover to produce a cover with a five-hole circular pattern that can be effectively inserted over a hub; the insertion effectiveness of the preferred embodiments of the invention is more ideal because conventional products are only equipped with a single-hole insertion pattern.

The design of the preferred embodiments of the invention is not only simple in structure, easy to assemble, reduces production time, and allows lower molding costs, but also provides more durable fastening capabilities after installation than the conventional products.

While the invention has been described in relation to what are considered the most practical and preferred embodiments, the invention is not limited to the disclosed embodiments, but additionally includes the various configurations within the spirit and scope of the broadest interpretations and equivalent adaptations.

What is claim is:

1. A hubcap fastener structure comprising
   a cap having a plurality of fastening mounts, each said fastening mount having extending therefrom an outer tubular mount and an inner tubular mount with a gap formed between the outer tubular mount and the inner tubular mount;
   a plurality of fittings, each said fitting having an attachment surface and a mounting hole in the attachment surface, wherein a plurality of retainer claws extend from an edge of the mounting hole in the attachment surface radially inwardly towards a center of the mounting hole, and a first end of each of a plurality of retainer strips extends from an outer edge of the attachment surface transversely relative to said retainer claws; and
   a plurality of engagement hooks positioned at a second end of each said retainer strip opposite said first end extending from the attachment surface,
   wherein said retainer claws and engagement hooks are resilient and said retainer claws are short relative to said retainer strips,
   wherein each of the fittings is arranged to be installed by inserting the retainer strips of the fittings into the gap between the outer tubular mount and the inner tubular mount such that said engagement hooks resiliently engage both said inner tubular mount and said outer tubular mount to secure the fittings to said fastening mounts, and
   wherein said retainer claws are arranged such that upon inserting the mounting holes of the fittings over bolts projecting from a vehicle hub, the retainer claws engage said bolts to secure the fittings to the bolts.

2. A hubcap fastener structure as claimed in claim 1, wherein the outer tubular mount and the inner tubular mount are concentrically positioned on the fastening mounts on the cap.

3. A hubcap fastener structure as claimed in claim 1, wherein a length of the inner tubular mount is less that a length of the outer tubular mount.

4. A hubcap fastener structure as claimed in claim 1, wherein said engagement hooks are inserted into said slots to a surface extending between the outer tubular mount and the inner tubular mount to accommodate the insertion of the said retainer strips on the said fittings.

5. A hubcap fastener structure as claimed in claim 1, wherein the retainer claws extend at equal intervals along the edge of the mounting holes in the attachment surfaces of the fittings.

* * * * *